United States Patent
Severini et al.

(10) Patent No.: US 7,090,188 B2
(45) Date of Patent: *Aug. 15, 2006

(54) EASY ENTRY SEAT ADJUSTER WITH MID POSITION MEMORY

(75) Inventors: Joseph Severini, Holland Landing (CA); Alan Kam Lun Chan, Markham (CA); Edilbert Delgado Yu, Ajax (CA)

(73) Assignee: Magna Seating Systems Inc., Aurora (CA)

( * ) Notice: Subject to any disclaimer, the term of this patent is extended or adjusted under 35 U.S.C. 154(b) by 143 days.

This patent is subject to a terminal disclaimer.

(21) Appl. No.: 10/344,998

(22) PCT Filed: Aug. 14, 2001

(86) PCT No.: PCT/CA01/01152
§ 371 (c)(1),
(2), (4) Date: Aug. 7, 2003

(87) PCT Pub. No.: WO02/14103

PCT Pub. Date: Feb. 21, 2002

(65) Prior Publication Data

US 2004/0026974 A1    Feb. 12, 2004

(51) Int. Cl.
*B60N 2/00* (2006.01)
*F16M 13/00* (2006.01)

(52) U.S. Cl. .................. 248/424; 248/429; 297/341
(58) Field of Classification Search ................ 248/424, 248/429, 430; 297/341, 344.11, 378.12; 296/65.14, 65.13
See application file for complete search history.

(56) References Cited

U.S. PATENT DOCUMENTS

| | | | |
|---|---|---|---|
| 4,639,038 A | 1/1987 | Heling | |
| 4,666,208 A | 5/1987 | Tatematsu et al. | |
| 4,844,542 A | 7/1989 | Humer | |
| 4,881,774 A | 11/1989 | Bradley et al. | |
| 4,964,608 A * | 10/1990 | Rogala et al. | 248/429 |
| 5,052,751 A | 10/1991 | Hayakawa et al. | |
| 5,275,370 A * | 1/1994 | Terai | 248/429 |
| 5,531,503 A | 7/1996 | Hughes | |
| 5,605,377 A | 2/1997 | Tame | |
| 5,626,392 A | 5/1997 | Bauer et al. | |
| 5,855,349 A | 1/1999 | Nini et al. | |
| 5,855,413 A | 1/1999 | Couasnon et al. | |
| 5,899,532 A | 5/1999 | Paisley et al. | |
| 5,944,383 A | 8/1999 | Mathey et al. | |

(Continued)

FOREIGN PATENT DOCUMENTS

WO    PCT/CA99/01047    5/2000

(Continued)

*Primary Examiner*—Anita M. King
(74) *Attorney, Agent, or Firm*—Clark Hill PLC (57) ABSTRACT

A track assembly (24) is provided for use on an automotive seat assembly (10) for providing forward and rearward movement of a seat assembly within a comfort range (C) of seating positions and a forwardly extended position (D) in a vehicle. The track assembly comprises a lower track and an upper track slidably coupled to the lower track. A locking mechanism is coupled between the upper and lower tracks and moveable between a locked position and an unlocked position for selectively locking the upper track to the lower track. A seat dumping mechanism is operatively coupled to the upper track for automatically actuating the locking mechanism between the locked and unlocked positions to extend the track assembly between the forwardly extended position (D) and a predetermined position (E) within the comfort range (c).

10 Claims, 6 Drawing Sheets

U.S. PATENT DOCUMENTS 6,098,946 A * 8/2000 Sechet et al. .............. 248/424
6,439,531 B1 * 8/2002 Severini et al. ............ 248/423
6,474,739 B1 * 11/2002 Lagerweij .................. 297/341
6,619,741 B1 * 9/2003 Tame ........................ 297/341
6,631,879 B1 * 10/2003 Hibino et al. .............. 248/429
6,772,985 B1 * 8/2004 Lee .......................... 248/424

FOREIGN PATENT DOCUMENTS

WO    PCT/IB00/01442    3/2001

* cited by examiner

EASY ENTRY SEAT ADJUSTER WITH MID POSITION MEMORY

BACKGROUND OF THE INVENTION

1. Field of the Invention

The subject invention relates to a track assembly for providing forward and rearward adjustment of an automotive seat assembly.

2. Description of the Prior Art

Automotive vehicles include vehicle seat assemblies for supporting an occupant seated in the vehicle. The seat assemblies typically comprise a seat cushion and a seat back pivotally connected to the seat cushion by a recliner mechanism for providing adjustment of the seat back relative to the seat cushion between a plurality of reclined positions. Further, seat assemblies typically include a track assembly which allows incremental forward and rearward sliding adjustment of the seat assembly within the vehicle within a comfort range of seating positions, such as between a full forward and full rearward position.

It is common for a track assembly to allow the seat assembly to slide forwardly to a forwardly extended position beyond the comfort range, i.e. the full forward position, in order to facilitate access to an area behind the seat assembly. Some track assemblies known in the art allow the seat assembly to return from the forwardly extended position to the full forward position. Other track assemblies allow the seat assembly to return to the full reward position within the comfort range. More complex and expensive track assemblies allow the seat to be returned to the original seating position.

It remains desirable to provide a track assembly which allows the seat assembly to slide to the forwardly extended position in response to forward pivoting of the seat back to a forward dump position and then returned to a default mid-position between the full forward and full rearward position of the comfort range.

SUMMARY OF THE INVENTION

According to one aspect of the invention a track assembly is provided for use on an automotive seat assembly for providing forward and rearward movement of a seat assembly within a comfort range of seating positions and a forwardly extended position in a vehicle. The track assembly comprises a lower track and an upper track slidably coupled to the lower track. A locking mechanism is coupled between the upper and lower tracks and moveable between a locked position and an unlocked position for selectively locking the upper track to the lower track. The locking mechanism comprises a release cam for actuating the locking mechanism between the locked and unlocked positions. A seat dumping mechanism is operatively coupled to the upper track for automatically actuating the locking mechanism between the locked and unlocked positions to extend the track assembly between the forwardly extended position and a predetermined position within the comfort range. The seat dumping mechanism includes a trigger body pivotally coupled to the lower track and defining the predetermined position within the comfort range. A cam plate is pivotally coupled to the upper track and operable between an actuated and unactuated position. The cam plate has a leading edge and a trailing edge for engaging the release cam and selectively actuating the locking mechanism between the locked and unlocked positions. A pawl is pivotally coupled to the upper track and has a forward arm for engaging the cam plate and retaining the cam plate in the actuated position and the locking mechanism in the unlocked position when in the forwardly extended position and a rearward arm for engaging the trigger body upon movement of the track assembly from the forwardly extended position to the comfort range to release the pawl from the cam plate and automatically return the cam plate to the unactuated position and the locking mechanism to the locked position securing the track assembly in the predetermined position within the comfort range.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
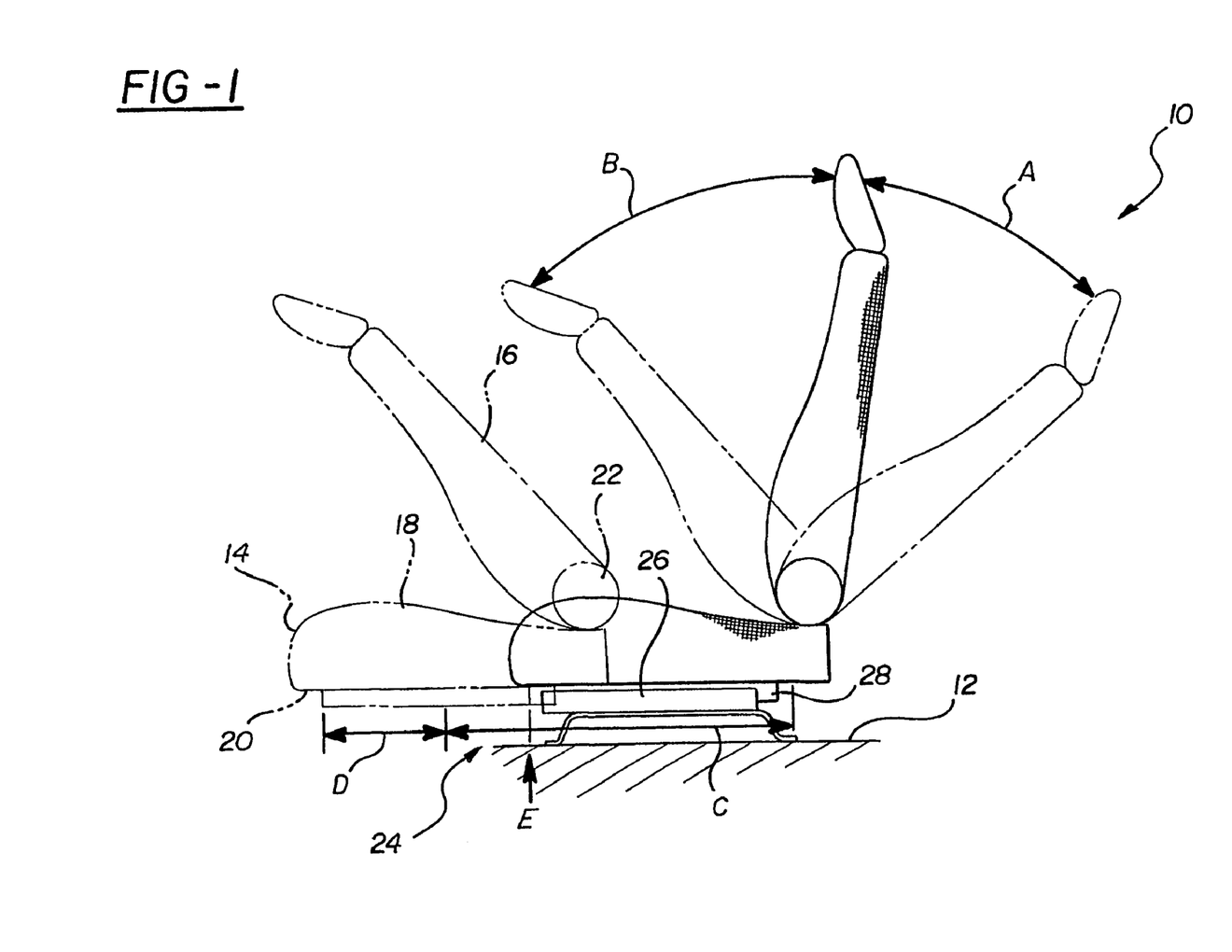
FIG. 1 is a schematic view of an automotive seat assembly incorporating the subject invention.

Referring to the Figures, FIG. 1 discloses a seat assembly 10 supported by a floor 12 of an automotive vehicle. The seat assembly 10 includes a seat cushion 14 and a seat back 16. The seat cushion 14 has an upper surface 18 for supporting an occupant and an opposite lower mounting surface 20. A recliner assembly 22 pivotally interconnects the seat back 16 to the seat cushion 14 and allows adjustment of the seat back 16 relative to the seat cushion 14 between a plurality of reclined seating positions, shown at A, and a forwardly dumped position, shown at B, as conventionally known to one of ordinary skill in the art. A track assembly 24 is disposed between the seat cushion 14 and the floor 12. The track assembly 24 allows incremental forward and rearward adjustment of the seat assembly 10 between a plurality of seating positions within a comfort range along the floor 12 of the vehicle, as shown at C. Further, the track assembly 24 also allows the seat assembly 10 to be moved beyond the forward-most seating position of the comfort range C to a forwardly extended position D in response to pivotal movement of the seat back 16 to the fowardly dumped position B. Described in detail below, the track assembly 24 allows the seat assembly 10 to be returned from the extended forward position C to a default middle seating position E within the comfort range C.

Figure 2:
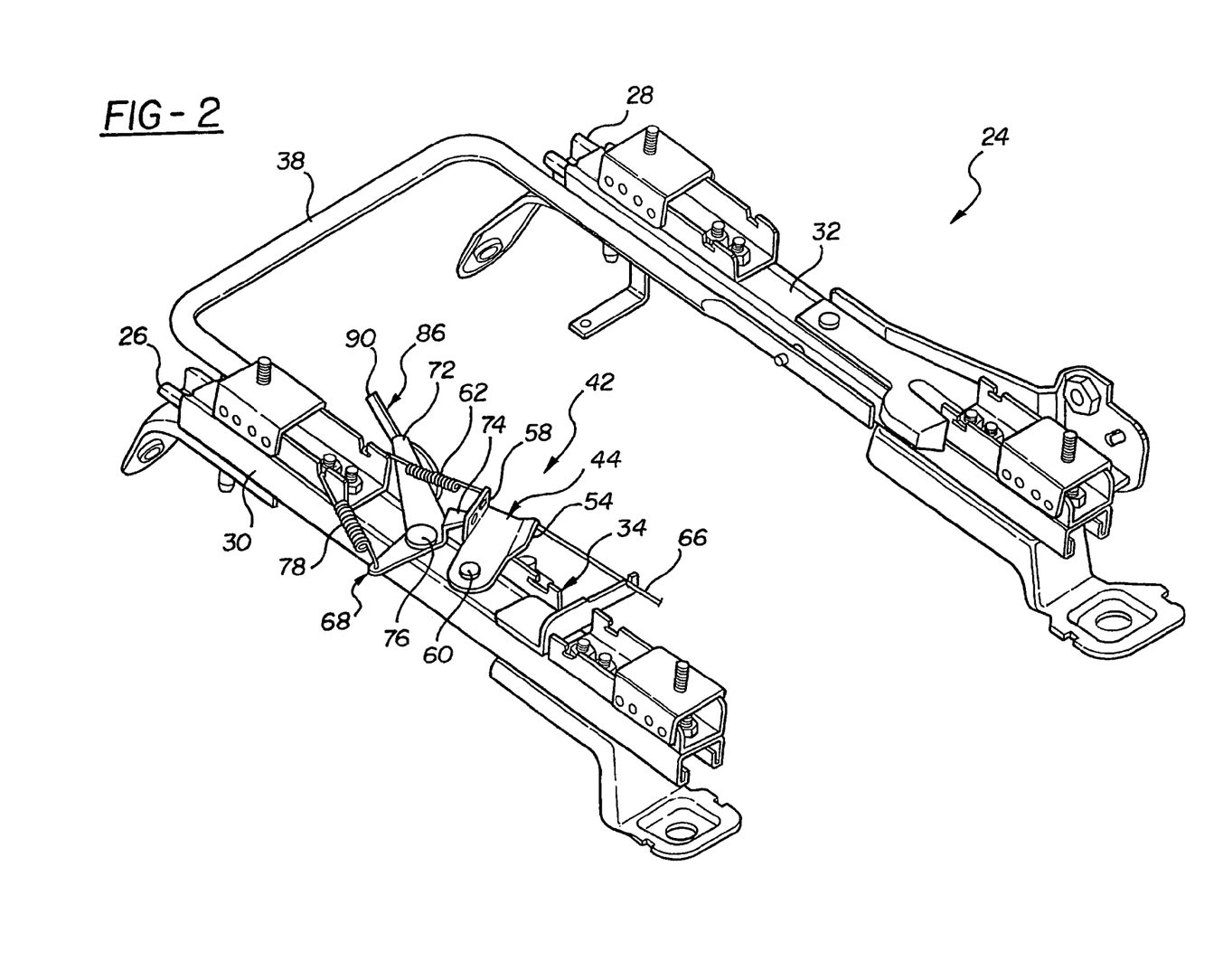
FIG. 2 is a top view of a track assembly according to the subject invention shown in a locked position.
Figure 3:
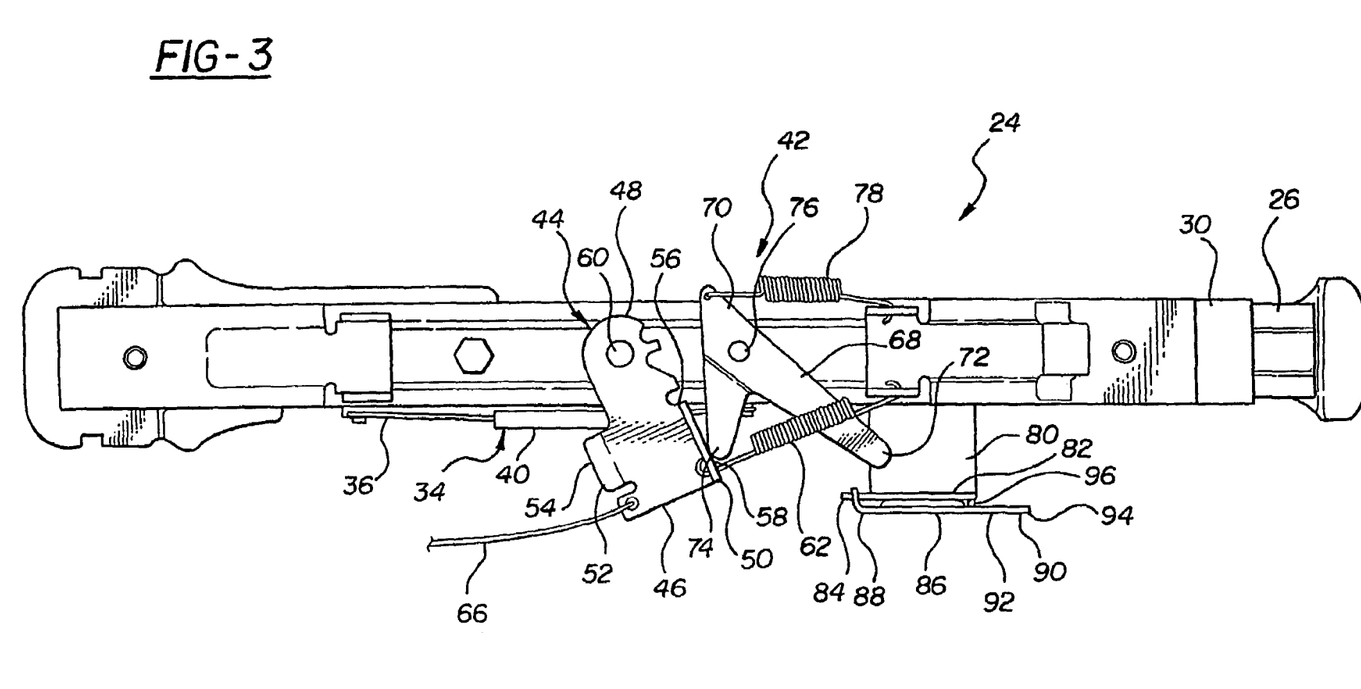
FIG. 3 is a top view of the track assembly having a locking mechanism shown in the locked position.
Figure 4:
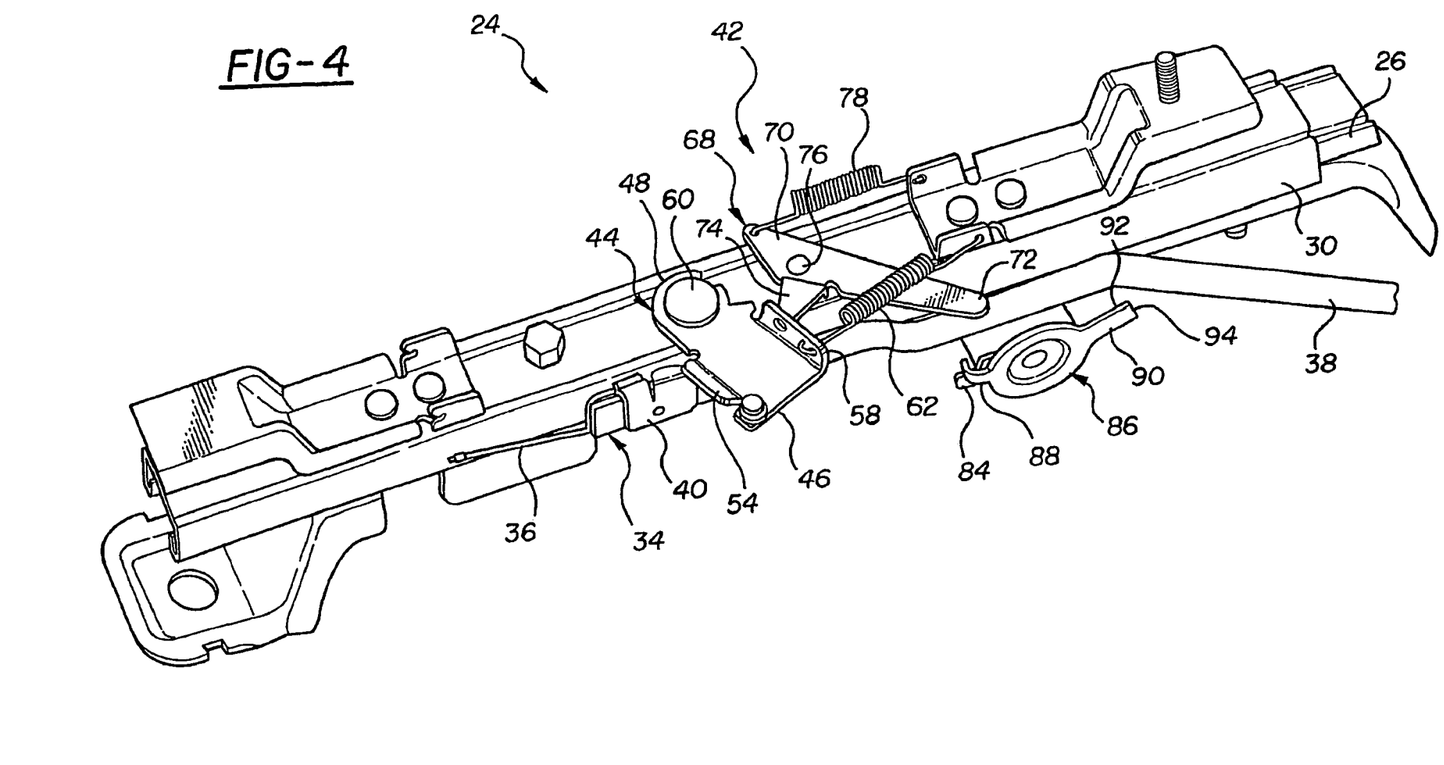
FIG. 4 is a perspective view of the track assembly having the locking mechanism shown in the locked position.
Figure 5:
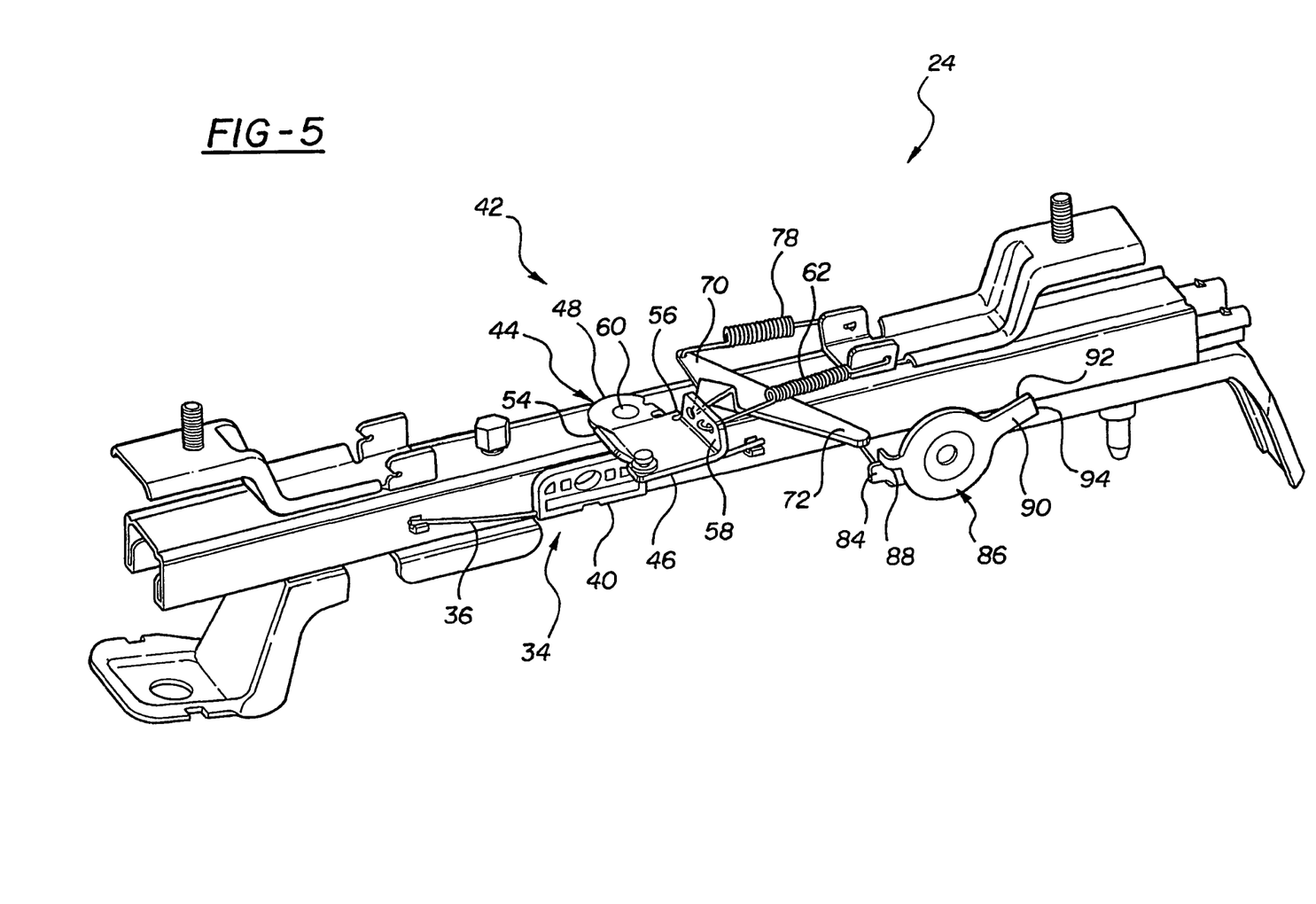
FIG. 5 is a perspective view of the track assembly with the locking mechanism shown in an unlocked position.
Figure 6:
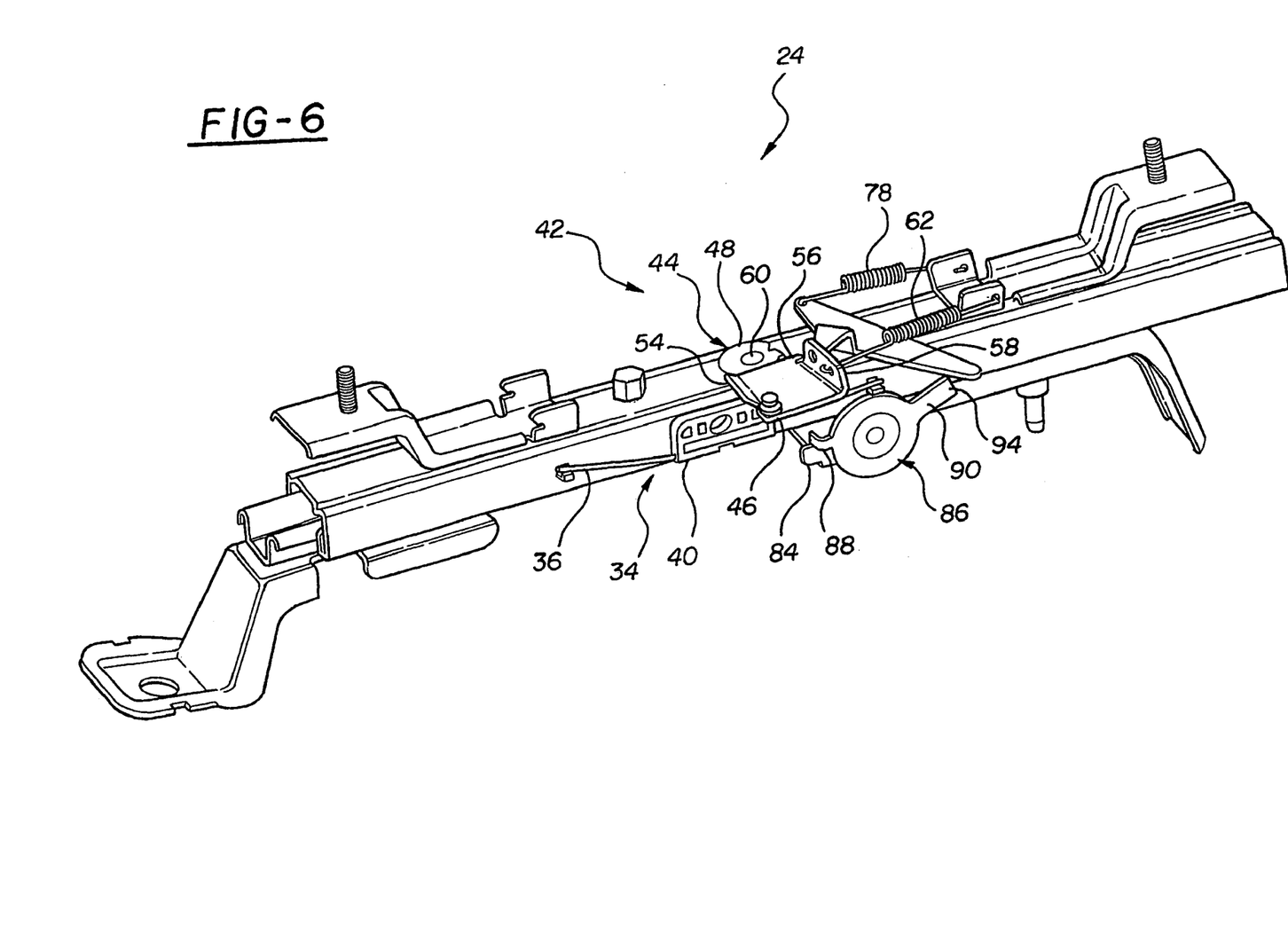
FIG. 6 is a perspective view of the track assembly shown in a middle seating position with the locking mechanism in the unlocked position.

Referring to FIGS. 1–4, the track assembly 24 comprises a pair of spaced apart and parallel elongated lower tracks 26, 28 fixedly attached to the floor 12 of the vehicle. The track assembly 24 also includes a pair of spaced apart and parallel elongated upper tracks 30, 32 fixedly attached to the lower surface 20 of the seat cushion 14 and slidably coupled to the lower tracks 26 28, respectively. A locking mechanism 34 is operatively coupled to at least one of the upper tracks 30, 32 for selectively interlocking the lower and upper tracks 26, 28, 30, 32. The locking mechanism 34 is selectively movable between a locked position, as shown in FIGS. 2, 3, and 4 and an unlocked position, as shown in FIGS. 5 and 6. In the locked position, the locking mechanism 34 maintains the position of the upper tracks 30, 32 relative to the lower tracks 26, 28, as conventionally known to one skilled in the art. A biasing member, such as a leaf spring, 36 biases the locking mechanism 34 to the locked position. A release bar 38 is pivotally mounted to the upper tracks 30, 32 and fixedly secured to the locking mechanism 34 for actuating the locking mechanism 34 between the locked and unlocked positions. The locking mechanism 34 further includes a release cam 40 connected to the release bar 38 for actuating the locking mechanism 34 between the locked and unlocked positions in response to pivotal movement of the release bar 38.

To selectively adjust the fore and aft position of the seat assembly 10, force is applied upwardly on the release bar 38 to actuate the locking mechanism 34 to the unlocked position. The seat assembly 10 may now slide forwardly or rearwardly relative to the floor 12 of the vehicle. Once the seat assembly 10 is moved to a desired position, the force applied to the release bar 38 is removed to allow the locking mechanism 34 to return to the locked position whereby the position of the seat assembly 10 is maintained within the comfort range C. Further detailed description and operation of the locking mechanism 34 are set forth in published PCT applications PCT/CA99/01047 and PCT/CA99/01001 which are incorporated herein by reference in their entirety.

The track assembly 24 further includes a seat dumping mechanism 42 which allows the seat assembly 10 to be moved to the forwardly extended position D in response to pivotal movement of the seat back 16 to the forward dump position. The dumping mechanism 42 also allows the seat assembly 10 to return from the forward extended position D to the middle seating position E within the comfort range C.

The dumping mechanism 42 comprises a cam plate 44 having a first end 46 and a second end 48 connected by substantially parallel leading and trailing edges 50, 52, respectively. A ramped portion 54 for slidably engaging the release cam 40 extends upwardly and rearwardly from the trailing edge 52. A notch 56 is formed in the leading edge 50 near the first end 46. An upstanding flange 58 extends between the second end 48 and the notch 56 along the leading edge 50. The first end 46 of the cam plate 44 is pivotally connected to the upper track 30 by any conventional means, such as by a pin or rivet 60. The cam plate 44 is pivotable between a non-actuated position, as shown in FIGS. 2, 3, and 4, and an actuated position, as shown in FIGS. 5 and 6. A first helical return spring 62 extends between the cam plate 44 and the upper track 30 for biasing the cam plate 44 in a counterclockwise direction, as viewed in FIGS. 2–6, towards the non-actuated position. A cable 66 operatively interconnects the cam plate 44 to the seat back 16 whereby the cam plate 44 is pulled from the non-actuated position to the actuated position in response to pivotal movement of the seat back 16 from one of the reclined seating positions A to the forwardly dumped position B.

The seat dumping mechanism 42 further includes a generally V-shaped pawl 68 having an intermediate region 70 interconnecting forward and rearward arms 72, 74 and is pivotally assembled by pivot pin 76 at its intermediate region 70 to the upper track 30 adjacent to the leading edge 50 of the cam plate 44. A second helical return spring 78 extends between the pawl 68 and the upper track 30 for biasing the pawl 68 in a clockwise direction, as viewed from the perspective shown in FIGS. 2–6.

A mounting bracket 80 is fixedly secured to and extends outwardly from the lower track 26. The position of the mounting bracket 80 along the lower track 26 generally defines the default middle position E within the comfort range C. The mounting bracket 80 includes a distal vertical portion 82 spaced apart from and generally parallel to the lower track 26. A trigger stop 84 extends rearwardly from the vertical portion 82.

A trigger body 86 is pivotally assembled to the vertical portion 82 of the mounting bracket 80. The trigger body 86 includes an abutment end 88 adjacent the trigger stop 84 and an opposite trigger arm 90 having an upper surface 92 and a distal end 94. The trigger body 86 is biased in a counterclockwise direction, as viewed in FIGS. 4 and 5, against the trigger stop 84 by any conventional means, such as by a coaxially mounted coil spring 96, thereby presenting the upper surface 92 of the trigger arm 90 for sliding engagement with the forward arm 72 of the pawl 68.

In operation, during normal seating use of the seat assembly 10, the track assembly 24 allows incremental forward and rearward adjustment of the seat assembly 10 within the comfort range C. As shown in FIGS. 3 and 4, the cam plate 44 is held in the non-actuated position by the return spring 62. The pawl 68 is biased in a clockwise direction such that the rearward arm 74 of the pawl 68 is held against a portion of the upstanding flange 58 of the cam plate 44. The spring rate of the first helical return spring 62 is higher than the spring rate of the second helical return spring 78 to prevent the pawl 68 from forcing the cam plate 44 out of the non-actuated position.

To move the seat assembly 10 to the forwardly extended position D, the seat back 16 is pivoted from one of the reclined seating positions A to the forwardly dumped position B. The seat back 16 pulls on cable 66 to rotate the cam plate 44 in the clockwise direction, as shown. As the cam plate 44 pivots clockwise to the actuated position in response to the forward motion of the seat back 16, the pawl 68 is pulled in a clockwise direction by the second helical return spring 78. The rearward arm 74 of the pawl 68 slides along the upstanding flange 58 towards the notch 56. Simultaneously, the ramped portion 54 of the cam plate 44 slidably engages the release cam 40 actuating the locking mechanism 34 to the unlocked position. Once the cam plate 44 reaches the actuated position, the rearward arm 74 is releaseably captured by the notch 56 and the forward arm 72 is positioned for engaging the upper surface 92 of the trigger arm 90, as best shown in FIG. 5. The cam plate 44 is held in the actuated position by interlocking engagement between the notch 56 and the rearward arm 74 of the pawl 68, thus maintaining the locking mechanism 34 in the unlocked position. The seat assembly 10 may now slide freely along the lower tracks 26, 28.

As the seat assembly 10 is moved towards the forwardly extended position D, the forward arm 72 of the pawl 68 slidably interfaces with the upper surface 92 of the trigger arm 90. The trigger body 86 rotates in a clockwise direction until the forward arm 72 slides beyond the distal end 94 of the trigger arm 90. Once the forward arm 72 slides past the distal end 94, the coil spring 96 forces the trigger body 86 to rotate back in a counterclockwise direction until the abutment end 88 engages and rests against the trigger stop 84. The distal end 94 of the trigger arm 90 is now presented for engaging the forward arm 72 of the pawl 68 upon sliding return of the seat assembly 10 from the forwardly extended position D to the middle position E within the comfort range C.

To return the seat assembly 10 from the forwardly extended position D to the middle position E within the comfort range C, the seat back 16 is first returned from the forwardly dumped position B to one of the reclined seating positions A to release the tension on the cable 66. As the seat assembly 10 is moved rearwardly, the forward arm 72 of the pawl 68 impacts the distal end 94 of the trigger body 86, as shown in FIG. 6 to rotate the pawl 68 in the counterclockwise direction. The rearward arm 74 is urged out of engagement with the notch 56 in the cam plate 44. The force of the first helical return spring 62 causes the cam plate 44 to rotate counterclockwise back towards the non-actuated position. The rearward arm 74 slides along the upstanding flange 58 away from the notch 56 as the pawl 68 pivots counterclockwise against the bias of the second helical return spring 78. The release cam 40 slides up the ramped portion 54 of the cam plate 44 and is released from engagement therewith allowing the locking mechanism 34 to return to the locked position, thus locking the seat assembly 10 in the default middle position E of the comfort range C. The seat assembly 10 may again be adjusted within the comfort range C or moved to the forwardly extended position D, as described above.

It should be appreciated that the mounting bracket 80 and trigger body 86 may be mounted to the lower track 26 along any position with the comfort range C to locate and relock the seat track assembly 24 upon return from the forwardly extended position D. It should also be appreciated that the seat dumping mechanism 42 may be provide on only one or both of the lower and upper tracks 26, 28, 30, 32 with the cam plates 44 linked for simultaneous actuation in response to the pivotal movement of the seat back 16.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A track assembly for use on an automotive seat assembly for providing forward and rearward movement of a seat assembly within a comfort range of seating positions, defined between a full forward and a full rearward seating position extending linearly along said track assembly, and a forwardly extended position, defined forward of said full forward seating position, in a vehicle, said track assembly comprising:
    a lower track;
    an upper track slidably coupled to said lower track;
    a locking mechanism coupled between said upper and lower tracks and moveable between a locked position and an unlocked position for selectively locking said upper track to said lower track, said locking mechanism comprising a release cam for actuating said locking mechanism between said locked position and unlocked position;
    a seat dumping mechanism operatively coupled to said upper track for automatically actuating said locking mechanism between said locked and unlocked positions to extend said track assembly between said forwardly extended position and a predetermined position within said comfort range, said seat dumping mechanism including a trigger body pivotally coupled to said lower track and defining said predetermined position within said comfort range;
    a cam plate pivotally coupled to said upper track and operable between an actuated and unactuated position, said cam plate having a leading edge and a trailing edge for engaging said release cam and selectively actuating said locking mechanism between said locked and unlocked positions;
    and a pawl pivotally coupled to said upper track and having a forward arm for engaging said cam plate and retaining said cam plate in said actuated position and said locking mechanism in said unlocked position when in said forwardly extended position and a rearward arm for engaging said trigger body upon movement of said track assembly from said forwardly extended position to said comfort range to release said pawl from said cam plate and automatically return said cam plate to said unactuated position and said locking mechanism to said locked position securing said track assembly in the predetermined position within said comfort range.

2. A track assembly as set forth in claim 1 further including a first return spring coupled between said cam plate and said upper track for biasing said cam plate to said unactuated position.

3. A track assembly as set forth in claim 2 further including a second return spring coupled between said pawl and said upper track for biasing said rearward arm against said cam plate.

4. A track assembly as set forth in claim 3 further including a mounting bracket fixedly secured to said lower track for rotatably supporting said trigger body.

5. A track assembly as set forth in claim 4 wherein said trigger body includes an abutment end for bias engagement with said mounting bracket and an opposite trigger arm for engagement with said forward arm of said pawl.

6. A track assembly as set forth in claim 5 further including a spring bias member coupled between said trigger body and said mounting bracket for biasing said abutment end against said mounting bracket.

7. A track assembly as set forth in claim 6 wherein said trigger arm includes a distal end for engaging said forward arm of said pawl upon return of said track assembly from said forwardly extended position to said comfort range to release said pawl from said cam plate and automatically lock said locking mechanism and said track assembly in said predetermined position.

8. A track assembly as set forth in claim 7 wherein said cam plate includes a ramped portion extending upwardly from said trailing edge for engaging said release cam and forcing said locking mechanism between said locked and unlocked positions.

9. A track assembly as set forth in claim 8 wherein said cam plate includes an upstanding flange for guiding said pawl therealong as said cam plate pivots between said unactuated and said actuated positions.

10. A track assembly as set forth in claim 9 wherein said cam plate includes a notch in said trailing edge adjacent said flange for engaging with said rearward arm of said pawl and retaining said cam plate in said actuated position against said release cam while maintaining said locking mechanism in said unlocked position.

* * * * *